United States Patent
Duda et al.

[19]

[11] Patent Number: 5,956,444

[45] Date of Patent: Sep. 21, 1999

[54] RADIATION ABSORBING SHIELD FOR FIBER OPTIC SYSTEMS

[75] Inventors: Donald W. Duda, Williams Bay, Wis.; David G. Mead, Naperville; David S. Rifkin, Aurora, both of Ill.

[73] Assignee: Amphenol Corporation, Wallingford, Conn.

[21] Appl. No.: 08/800,120

[22] Filed: Feb. 13, 1997

[51] Int. Cl.[6] .................................................. G02B 6/36
[52] U.S. Cl. ............................... 385/53; 385/58; 385/73; 385/75; 385/77; 385/140
[58] Field of Search .................................. 385/19, 23, 53, 385/58, 73, 75, 76, 77, 78, 79, 139, 140

[56] References Cited

U.S. PATENT DOCUMENTS

| | | | |
|---|---|---|---|
| 3,683,167 | 8/1972 | Rishton | 240/1 |
| 3,886,544 | 5/1975 | Narodny | 340/365 |
| 4,025,776 | 5/1977 | Cawood et al. | 240/1 |
| 4,376,566 | 3/1983 | Blackington | 385/19 |
| 4,422,714 | 12/1983 | Benoit et al. | 350/96.15 |
| 4,556,280 | 12/1985 | Bagby | 385/19 |
| 4,560,238 | 12/1985 | Mori | 385/16 |
| 4,611,887 | 9/1986 | Glover et al. | 350/96.21 |
| 4,640,575 | 2/1987 | Dumas | 350/96.2 |
| 4,712,861 | 12/1987 | Lukas et al. | 350/96.21 |
| 4,738,506 | 4/1988 | Abendschein et al. | 350/96.2 |
| 4,779,950 | 10/1988 | Williams | 350/96.21 |
| 4,836,636 | 6/1989 | Obara et al. | 385/19 |
| 4,960,317 | 10/1990 | Briggs et al. | 350/96.21 |
| 4,989,938 | 2/1991 | Tamulevich | 385/140 |
| 5,104,242 | 4/1992 | Ishikawa | 385/53 |
| 5,133,030 | 7/1992 | Lee | 385/19 |
| 5,274,722 | 12/1993 | Saitoh et al. | 385/78 |
| 5,363,460 | 11/1994 | Marazzi et al. | 385/55 |
| 5,414,790 | 5/1995 | Lee et al. | 385/139 |
| 5,506,922 | 4/1996 | Grois et al. | 385/75 |

*Primary Examiner*—Hemang Sanghavi
*Attorney, Agent, or Firm*—Bacon & Thomas PLLC

[57] ABSTRACT

A shield for the end of a fiber optic connector or fiber optic connector adapter is disclosed. The shield includes a radiation absorbing element which prevents significant amounts of potentially harmful electromagnetic radiation from being discharged through the end of a connector or adapter.

14 Claims, 2 Drawing Sheets

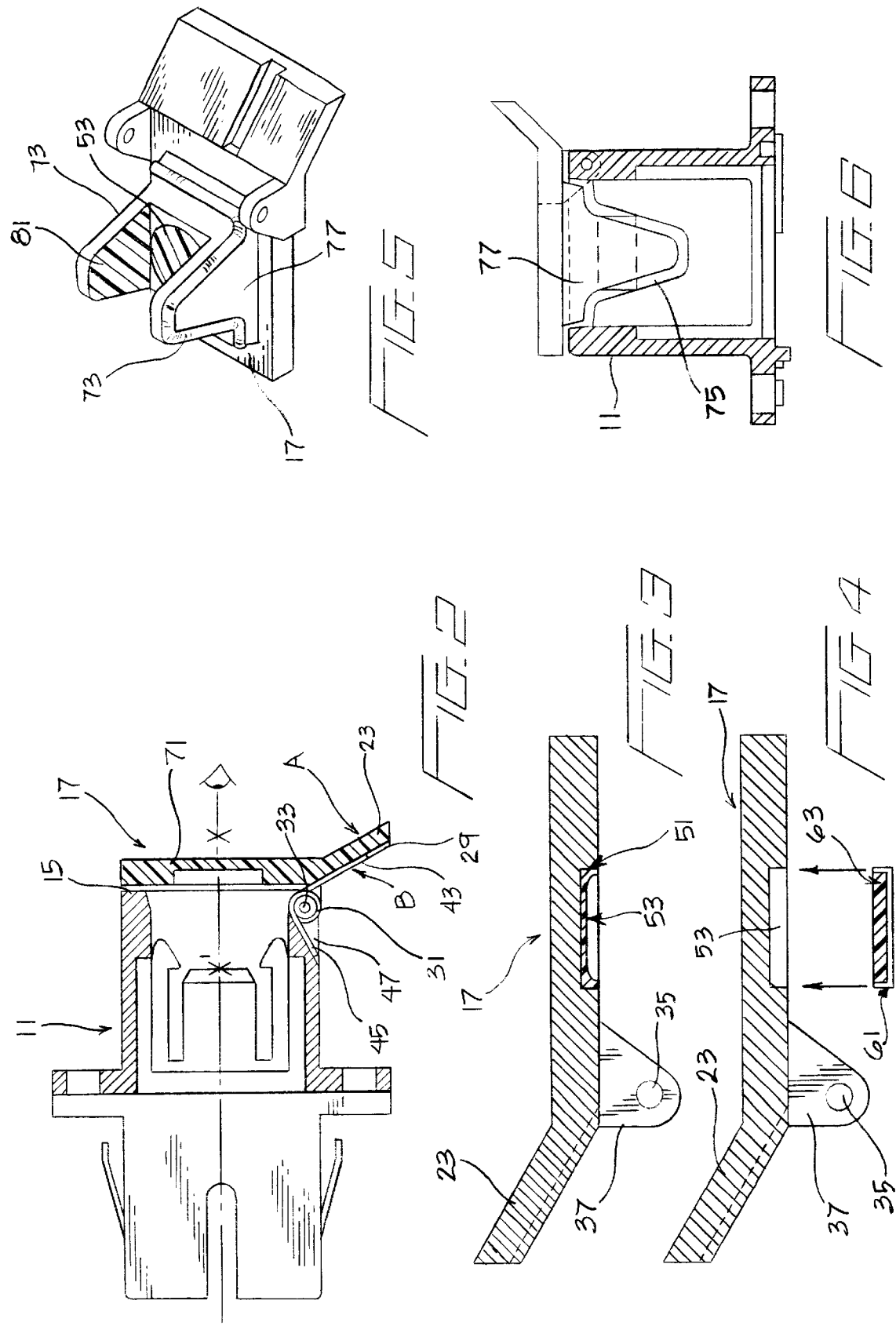

RADIATION ABSORBING SHIELD FOR FIBER OPTIC SYSTEMS

BACKGROUND OF THE INVENTION

1. Field of the Invention

This invention is directed to a radiation absorbing shield which prevents the emission of harmful electromagnetic radiation from a fiber optic system.

2. Description of the Prior Art

Light energy generated by a broadband source, or an optical resonator source such as a laser, may be transmitted by the use of fiber optic systems using fiber optic cable and connectors. Typically, a fiber optic system begins with a source such as a laser which generates a light energy signal and injects it into an optical fiber. The signal travels through the system through a series of optical fibers which are connected in end-to-end fashion by connection assemblies. Each connection assembly comprises an optical fiber connector attached to the end of each optical fiber and an adapter which receives the ends of the connectors and precisely aligns the optical fibers in the connectors in abutting, end-to-end relationship.

As described in U.S. Pat. Nos. 4,779,950 and 5,506,922, the disclosures of which are hereby incorporated by reference, there is a need when terminating an optical fiber in a connector to protect the terminated end of the optical fiber from adverse environment hazards, such as dust and dirt, which can impair the optical transmission capabilities of the fiber. There is also a need to protect the system operator's eyes from the dangerous high energy light beams being transmitted through the fiber. This is particularly true when the optical fiber transmitting an optical signal is not connected to a mating fiber.

To meet these needs, the above-referenced U.S. patents propose to cover the end of the optical fiber connector with a protective shield which can be removed to expose the end of the terminated optical fiber for mating with another optical fiber terminated in a mating connector.

U.S. Pat. No. 5,506,922, further discloses providing diversion means on the inside of the shield to prevent light energy from being reflected back into the terminated optical fiber.

While the optical fiber connector shields described in these two patents prevent dust and dirt from entering the end of the connector and, in the case of U.S. Pat. No. 5,506,922, prevent "feed-back" of light energy into the terminated optical fiber, they do not significantly reduce the amount of light energy which passes from the end of the optical fiber when the connector is not mated. Even with these shields in place, potentially hazardous amounts of light energy pass through the shield; posing severe risks to an operator's eyes. Accordingly, there remains a need in the art for a shield for an optical fiber connector which is capable of significantly reducing the amount of light energy which passes through it.

SUMMARY OF THE INVENTION

It is an object of the invention to provide a shield for an optical fiber connector that significantly reduces the amount of light which passes from the connector, thereby minimizing the hazards to the environment resulting from stray electromagnetic radiation and, at the same time, protects the terminated optical fiber from adverse environmental hazards.

This and other objects and advantages are achieved, in accordance with the invention, by a shield for an optical fiber connector or adapter comprising a cover member for enclosing the connecting end of an optical fiber connector or adapter including means for absorbing light energy.

Other objects and advantages of the invention will be evident to those of ordinary skill in the art upon review of the entire disclosure herein.

BRIEF DESCRIPTION OF THE FIGURES OF DRAWING

FIG. 2 is a side view, in partial cross section, of an adapter for aligning two optical fiber connectors, which includes the radiation absorbing shield of the invention.

FIG. 3 is a cross-sectional view of one embodiment of a radiation absorbing shield in accordance with the invention.

FIG. 4 is a cross-sectional view of an alternative embodiment for the radiation absorbing shield of the invention.

FIG. 5 is a perspective of another alternative embodiment of the invention that shields stray or extraneous radiation emanating from the side of the fiber optic system.

FIG. 6 is a cross-sectional view of the embodiment shown in FIG. 5.

DETAILED DESCRIPTION OF THE INVENTION

Figure 1:
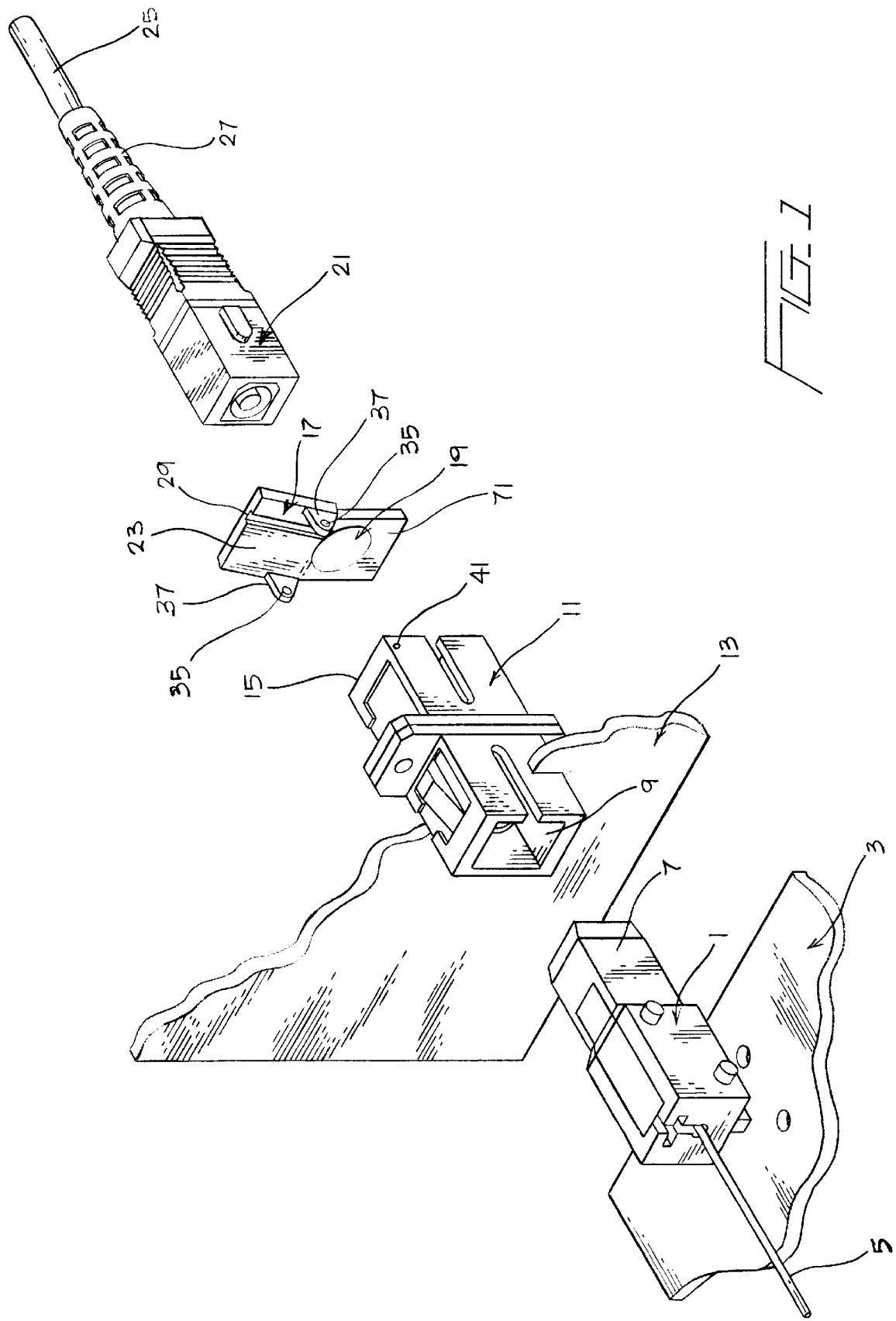
FIG. 1 is an exploded perspective view of a fiber optic connection assembly including the radiation absorbing shield of the invention.

FIG. 1 shows a typical connection assembly for connecting an optical fiber from a board mounted connector to an optical fiber in a fiber optic cable using the radiation absorbing shield of the invention. The assembly includes optical fiber connector 1 which is mounted on board 3, which may be a printed circuit board or other type of mounting board for optical fiber. Board mounted connector 3 terminates optical fiber 5 which is optically connected to other components in the fiber optic transmission system (not shown), such as a laser for generating the light signals which are transmitted through the system. Connector 1 has a front portion 7 which is adapted to fit into a receptacle in one end 9 of adapter 11 which extends through mounting panel 13. Mounting panel 13 is disposed generally perpendicular to board 3 and may be the end wall of a module or other container for board 3.

The other end 15 of adapter 11 is fitted with radiation absorbing shield 17. As discussed in greater detail below, shield 17 includes cover member 71 with radiation absorber 19 on its surface facing end 15. When end 15 of adapter 11 is not connected to a fiber optic connector, cover member 71 is closed over end 15 and held in this position by spring force. Groove 29 receives one end of coil spring 31 as shown in FIG. 2. When the adapter is connected to a fiber optic connector, such as SC pigtail 21, cover member 71 is pushed open by applying pressure to inclined tab 23 on shield 17, in the direction of arrow A in FIG. 2. Connector 21 can then be inserted through the opened end 15 into a receptacle in this end of the adapter. Once connector 21 is inserted into the adapter, the pressure applied to inclined tab 23 can be released.

Connector 21 terminates an optical fiber contained in optical cable 25. Flexible boot 27 extends from the rear of connector 21 over a section of cable 25 to provide strain relief.

FIG. 2 shows radiation absorbing shield 17 in the closed position on end 15 of adapter 11. The cover member 71 of the shield is held in the closed position under the force of spring 31 which is coiled around pin 33 which pivotally connects the shield 17 to adapter 11 by attachment through holes 35 in flanges 37 on shield 17 and holes 41 adjacent end 15 of adapter 11. Spring 31 has tails 43 and 45 which fit, respectively, in groove 29 of shield 17 and slot 47 in the front end 15 of adapter 11. In this manner, tail 43 applies a spring force to tab 23 of the shield in the direction of arrow B. This forces cover member 71 to close against the face of front portion 15 of the adapter when the adapter is disconnected. A greater force applied to tab 23 in the direction of arrow A overcomes the spring force and rotates cover member 71 clockwise from the closed position to an opened position to allow a connector to be inserted through front portion 15 of the adapter.

FIG. 3 shows a radiation absorbing material 51 applied to the surface of cover member 71 in cavity 53. The cavity is preferably positioned at the center of the inside surface of the cover member so that it faces the connecting end of the adapter and aligns with the central axis of the adapter when in the closed position. The radiation absorbing material may be applied to the surface of the cavity by coating or injection or any other suitable method.

Alternatively, as shown in FIG. 4, a plug 61 containing radiation absorbing material 63 may be inserted into cavity 53. In this case, the plug is preferably secured in the cavity with adhesive, such as epoxy, or a press fit.

FIG. 5 shows a radiation absorbing material 81 applied to the inner surface of two side lobes 73 of cover member 17 as well as cavity 53. The coating or cavity may be positioned perpendicular to the inside surface of the cover member, so that it parallels the connecting end of the adapter and is perpendicularly aligned with the central axis of the adapter when in the closed position, as shown in FIG. 6.

Also as shown in FIG. 6, side lobes 73 extend from a raised section or pedestal 77 on the inner surface of the cover member 17 and have an outwardly extending collar 75 which runs along the outside perimeter of the side lobes and pedestal so that, when in the closed position, as shown in FIG. 6, collar 75 abuts the inner surface of adapter 11 leaving no opening for extraneous light to escape.

A variety of materials including conductors may be used as the radiation absorbing material. Synthetic resins containing carbon black are particularly suitable. In the example which follows, the material used to form the radiation absorbing material in the test cover was a synthetic resin manufactured by Spraylat. The radiation absorber was produced by mixing and injecting Spraylat formulations A (catalyst) and B (resin) into a cavity on the inside surface of the cover member and curing.

EXAMPLE—COMPARATIVE TESTING

In order to illustrate the improved performance of the radiation absorbing shield of the invention compared to conventional adapter shields described in the prior art, the following test were conducted:

Three different shields for a fiber optic adapter were tested. The first was a standard shield of the type described in U.S. Pat. No. 4,779,950 with no radiation absorbing means and no diversion means. The second was a shield with diversion means of the type described in U.S. Pat. No. 5,506,922 and no radiation absorbing means. The third was a shield with radiation absorbing means in accordance with the invention.

A source, as typically used in the data communication and telecommunications industry, was used. With the shields placed in the adapter and shut, the source had an operating power of $1.074 \times 10^{-4}$ W, at a wavelength of 1330 nm as measured along the optical axis at X (See FIG. 2).

The results of the tests are set forth in Tables 1–9 for the three different shields. In these tables, the letter Y signifies YES, the letter N signifies NO, the asterisk (*) signifying less than $10^{-8}$ W.

TABLE 1

SHIELD WITH NO ABSORBER
This Table displays transmission characteristics of a green shield at 1330 nm wavelength.

| SOURCE ON | 1330 nm | SHIELD | SHIELD COLOR | ABSORBER | TRANSMISSION $\mu$w $10^{-5}$ W |
|---|---|---|---|---|---|
| Y | Y | Y | GREEN | N | 1.301 |
| Y | Y | Y | GREEN | N | 1.444 |
| Y | Y | Y | GREEN | N | 1.460 |
| Y | Y | Y | GREEN | N | 1.182 |
| Y | Y | Y | GREEN | N | 1.196 |
| Y | Y | Y | GREEN | N | 1.145 |
| Y | Y | Y | GREEN | N | 1.152 |
| Y | Y | Y | GREEN | N | 1.223 |
| Y | Y | Y | GREEN | N | 1.191 |
| Y | Y | Y | GREEN | N | 1.893 |
| Y | Y | Y | GREEN | N | 1.908 |
| Y | Y | Y | GREEN | N | 1.175 |
| Y | Y | Y | GREEN | N | 1.141 |
| Y | Y | Y | GREEN | N | 1.120 |
| Y | Y | Y | GREEN | N | 1.079 |
| Y | Y | Y | GREEN | N | 1.214 |
| Y | Y | Y | GREEN | N | 1.497 |

TABLE 2

SHIELD WITH A DIVERTING SURFACE
This Table displays the transmission characteristics of a green shield with a diverting surface as per U.S. Pat. No. 5,506,922 at 1330 nm wavelength.

| SOURCE ON | 1330 nm | SHIELD | SHIELD COLOR | ABSORBER | TRANSMISSION $\mu$w $10^{-5}$ W |
|---|---|---|---|---|---|
| Y | Y | w/div. | GREEN | N | 1.962 |
| Y | Y | w/div. | GREEN | N | 1.267 |
| Y | Y | w/div. | GREEN | N | 1.658 |
| Y | Y | w/div. | GREEN | N | 1.077 |
| Y | Y | w/div. | GREEN | N | 1.328 |
| Y | Y | wldiv. | GREEN | N | 1.377 |
| Y | Y | w/div. | GREEN | N | 1.846 |
| Y | Y | w/div. | GREEN | N | 1.066 |
| Y | Y | w/div. | GREEN | N | 1.806 |
| Y | Y | w/div. | GREEN | N | 1.178 |
| Y | Y | w/div. | GREEN | N | 2.120 |
| Y | Y | w/div. | GREEN | N | 2.380 |
| Y | Y | w/div. | GREEN | N | 2.736 |
| Y | Y | w/div. | GREEN | N | 1.863 |
| Y | Y | w/div. | GREEN | N | 2.150 |
| Y | Y | w/div. | GREEN | N | 1.418 |
| Y | Y | w/div. | GREEN | N | 1.602 |
| Y | Y | w/div. | GREEN | N | 1.809 |
| Y | Y | w/div. | GREEN | N | 2.370 |
| Y | Y | w/div. | GREEN | N | 2.324 |
| Y | Y | w/div. | GREEN | N | 2.326 |
| Y | Y | w/div. | GREEN | N | 1.685 |
| Y | Y | w/div. | GREEN | N | 2.346 |
| Y | Y | w/div. | GREEN | N | 2.177 |
| Y | Y | w/div. | GREEN | N | 2.133 |

TABLE 3

SHIELD WITH NO ABSORBER
This Table displays transmission characteristics of a blue shield at 1330 nm wavelength.

| SOURCE ON | 1330 nm | SHIELD | SHIELD COLOR | ABSORBER | TRANSMISSION $\mu w\ 10^{-5}$ W |
|---|---|---|---|---|---|
| Y | Y | Y | BLUE | N | 1.497 |
| Y | Y | Y | BLUE | N | 1.301 |
| Y | Y | Y | BLUE | N | 1.444 |
| Y | Y | Y | BLUE | N | 1.460 |
| Y | Y | Y | BLUE | N | 1.182 |
| Y | Y | Y | BLUE | N | 1.196 |
| Y | Y | Y | BLUE | N | 1.145 |
| Y | Y | Y | BLUE | N | 1.152 |
| Y | Y | Y | BLUE | N | 1.813 |
| Y | Y | Y | BLUE | N | 1.908 |
| Y | Y | Y | BLUE | N | 1.214 |
| Y | Y | Y | BLUE | N | 1.079 |
| Y | Y | Y | BLUE | N | 1.120 |
| Y | Y | Y | BLUE | N | 1.141 |
| Y | Y | Y | BLUE | N | 1.175 |
| Y | Y | Y | BLUE | N | 1.191 |
| Y | Y | Y | BLUE | N | 1.223 |

TABLE 4

SHIELD WITH A DIVERTING SURFACE
This Table displays the transmission characteristics of a blue shield with a diversion formed in its surface as per U.S. Pat. No. 5,506,922 at 1330 nm.

| SOURCE ON | 1330 nm | SHIELD | SHIELD COLOR | ABSORBER | TRANSMISSION $\mu w\ 10^{-5}$ W |
|---|---|---|---|---|---|
| Y | Y | w/div. | BLUE | N | 0.723 |
| Y | Y | w/div. | BLUE | N | 0.453 |
| Y | Y | w/div. | BLUE | N | 0.556 |
| Y | Y | w/div. | BLUE | N | 0.5811 |
| Y | Y | w/div. | BLUE | N | 0.545 |
| Y | Y | w/div. | BLUE | N | 0.442 |
| Y | Y | w/div. | BLUE | N | 0.387 |
| Y | Y | w/div. | BLUE | N | 0.923 |
| Y | Y | w/div. | BLUE | N | 0.681 |

TABLE 5

SHIELD WITH ABSORBER
This Table displays the transmission characteristics at 1330 nm of shields with a radiation absorber added in accordance with the invention.

| SOURCE ON | 1330 nm | SHIELD | SHIELD COLOR | ABSORBER | TRANSMISSION $\mu w\ 10^{-5}$ W |
|---|---|---|---|---|---|
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |
| Y | Y | Y | GREEN | w/absorber | undetectable* |

TABLE 6

SHIELD WITH NO ABSORBER
This Table displays the transmission characteristics of green shields. The detector and laser emission source are conjugate to positions X and X' shown in FIG. 2.

| EXTERNAL OUTDOOR SOURCE ON | 1330 nm | SHIELD | SHIELD COLOR | AB-SORBER | TRANSMISSION $\mu w\ 10^{-5}$ W |
|---|---|---|---|---|---|
| Y | Y | Y | GREEN | N | 1.696 |
| Y | Y | Y | GREEN | N | 1.683 |
| Y | Y | Y | GREEN | N | 1.550 |

TABLE 7

SHIELD WITH NO ABSORBER
This Table displays the transmission characteristics of a green shield with a diversion formed on its surface, as per U.S. Pat. No. 5,506,922. The laser source is placed outside the closed adapter door shield. The detector is placed inside the adapter housing.

| EXTERNAL OUTDOOR SOURCE ON | 1330 nm | SHIELD | SHIELD COLOR | AB-SORBER | TRANSMISSION $\mu w\ 10^{-5}$ W |
|---|---|---|---|---|---|
| Y | Y | w/div. | GREEN | N | 1.893 |
| Y | Y | w/div. | GREEN | N | 1.910 |
| Y | Y | w/div. | GREEN | N | 1.377 |

TABLE 8

SHIELD WITH AN ABSORBER
This Table displays the transmission characteristics of a shield with an absorber in accordance with the invention at 1330 nm wavelength.

| EXTERNAL OUTDOOR SOURCE ON | 1330 nm | SHIELD | SHIELD COLOR | AB-SORBER | TRANSMISSION $\mu w\ 10^{-5}$ W |
|---|---|---|---|---|---|
| Y | Y | Y | GREEN | Y | undetectable* |
| Y | Y | Y | GREEN | Y | undetectable* |
| Y | Y | Y | GREEN | Y | undetectable* |

TABLE 9

SHIELD WITH AN ABSORBER
This Table displays the transmission characteristics of a blue shield with an absorber in accordance with the invention at 1330 nm.

| SOURCE ON | 1330 nm | SHIELD | SHIELD COLOR | ABSORBER | TRANSMISSION $\mu w\ 10^{-5}$ W |
|---|---|---|---|---|---|
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |
| Y | Y | Y | BLUE | w/absorber | undetectable* |

From the data contained in these tables, it is evident that both a standard shield and a shield with diversion means do not prevent significant amounts of light energy from being transmitted through the shield. A shield made in accordance with the invention, to the contrary, all but eliminates the transmission of light energy through the shield.

Although described with respect to preferred embodiments of the invention, it should be readily understood that various changes and/or modifications may be made without departing from the spirit of the invention. In general, the invention is only intended to be limited by the scope of the following claims.

We claim:

1. A shield for an optical fiber connector or adapter comprising a cover member for enclosing the connecting end of said connector or adapter, said cover member including means for absorbing light energy to prevent the light energy from emitted by said fiber from being transmitted through said cover member, and further comprising spring means for biasing the cover member against the connecting end of said connector or adapter.

2. The shield as claimed in claim 1, wherein said cover member has two flanges disposed on opposite sides of the cover member which are pivotally connected to the connecting end of said connector or adapter to allow the cover member to be rotated from a closed position against the connecting end of said connector or adapter to an opened position to permit insertion of a connecting member into the connecting end of the connector or adapter.

3. The shield as claimed in claim 1, wherein said means for absorbing light energy is disposed on the surface of the cover member facing the connecting end of the connector or adapter.

4. The shield as claimed in claim 3, wherein said means for absorbing light energy is a synthetic resin containing carbon black.

5. The shield as claimed in claim 4, wherein said cover member includes a cavity in the surface facing the connecting end of the connector or adapter and said light energy absorbing means is disposed in said cavity.

6. The shield as claimed in claim 2, wherein the light energy absorbing means is positioned on said cover member so as to be on the optical axis of the connector or adapter when the cover member is in the closed position.

7. The shield as claimed in claim 3, further comprising two side lobes extending from the surface of the cover member facing the connecting end of the connector or adapter.

8. The shield as claimed in claim 7, wherein said side lobes have radiation absorbing material on at least a portion of their inner surfaces.

9. The shield as claimed in claim 8, wherein said side lobes extend outwardly from a pedestal on the inside surface of the cover member.

10. The shield as claimed in claim 9, wherein said pedestal and side lobes have a collar running along their outside perimeter which abuts the inside surface of the adapter or connector when the cover is in the closed position.

11. An adapter for mating an optic fiber along an optical axis with an associated optical fiber transmission means, comprising:

an optical fiber connector including a housing terminating an optical fiber, an adapter having two ends with a first receptacle at one end for receiving an optical fiber connector and a second receptacle at the other end for mating with an associated optical fiber transmission means, and a cover member attached to the end of the adapter with the first receptacle for receiving an optical fiber connector, said cover member being movable from a closed position enclosing the end of the adapter to an opened position allowing inserting of an optical fiber connector into the receptacle, said cover member including light energy absorbing means on the surface facing the end of the adapter.

12. The adapter as claimed in claim 11, wherein said cover member is pivotally attached to the end of the adapter so that it can be rotated from a closed position to an opened position.

13. The adapter as claimed in claim 12, wherein said light energy absorbing means is positioned on the cover member such that it lies on the optical axis of the adapter when the cover member is in the closed position.

14. The adapter as claimed in claim 11, wherein said fiber optic transmission means transmits light energy from a laser.

* * * * *

UNITED STATES PATENT AND TRADEMARK OFFICE
CERTIFICATE OF CORRECTION

PATENT NO. : 5,956,444

DATED : September 21, 1999

INVENTOR(S) : Donald W. Duda et al.

It is certified that an error appears in the above-identified patent and that said Letters Patent is hereby corrected as shown below:

Column 7, line 41 (Claim 6), "2" should read –3–.

Signed and Sealed this

First Day of May, 2001

Attest:

NICHOLAS P. GODICI

Attesting Officer     Acting Director of the United States Patent and Trademark Office